May 31, 1960 N. D. NEWBY 2,939,109

SIGNALING SYSTEM

Filed Dec. 16, 1957

2 Sheets-Sheet 1

INVENTOR
N. D. NEWBY
BY Kenneth B Hamlin
ATTORNEY

May 31, 1960 N. D. NEWBY 2,939,109

SIGNALING SYSTEM

Filed Dec. 16, 1957

2 Sheets-Sheet 2

INVENTOR
N. D. NEWBY
BY Kenneth B Hamlin
ATTORNEY

United States Patent Office 2,939,109

Patented May 31, 1960

2,939,109

SIGNALING SYSTEM

Neal D. Newby, Leonia, N.J., assignor to Bell Telephone Laboratories, Incorporated, New York, N.Y., a corporation of New York Filed Dec. 16, 1957, Ser. No. 703,216

23 Claims. (Cl. 340—147)

Figure 1:
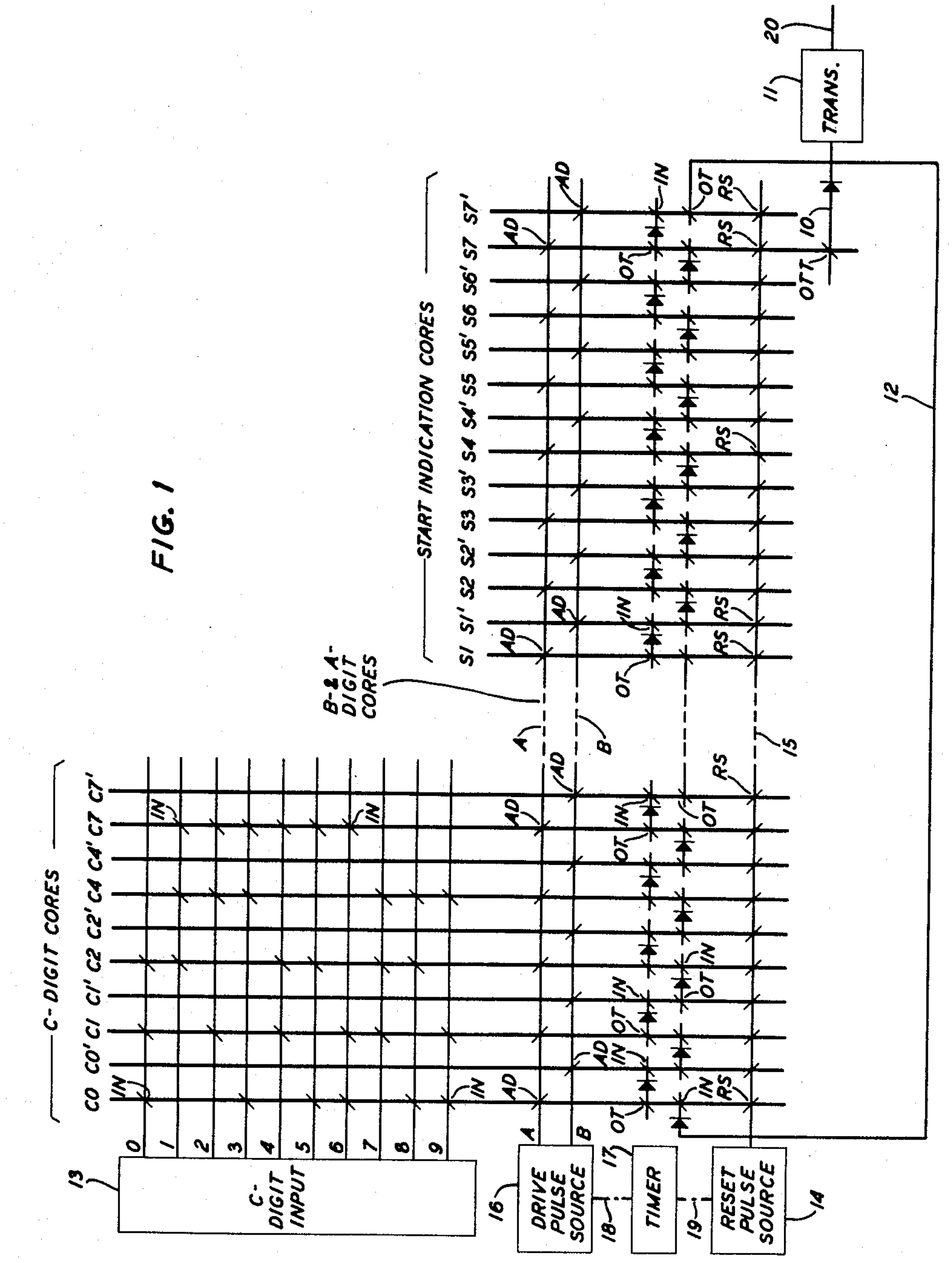

This invention relates to selective signaling systems and particularly to methods and apparatus for transmitting and receiving coded electrical impulses in media in which high level noise is prevalent.

Selective signaling systems to control the automatic establishment of air-to-ground communication paths, ship-to-ship communication paths, to alert or call selected stations of a ground communication system or to control and supervise industrial operations from remote control locations must frequently transmit coded electrical impulses via transmission media in which the signal-to-noise ratios are considerably poorer than usually encountered in commercial channels. Selective signaling systems have been proposed heretofore for selective signaling under such transmission conditions wherein selective signals representing the designations or directory numbers of called stations are transmitted from a calling station to a called station in sequential pulse position codes. The sequential transmission of the pulse position codes representing a complete called designation are cyclically repeated with a start signal code being transmitted at the beginning of each cycle until the complete designation has been received and properly registered at the called station. The receiving apparatus utilized at the called station in such systems is arranged to register each complete designation cyclically received from the transmitting apparatus and to check this designation for plausibility. If it is found on any transmission of the complete designation that any of the codes received and registered are implausible, the receiver discards all the received codes and registers the succeeding codes received during the next cycle of the repetitive transmission. This process is successively carried out until valid or plausible codes for the entire designation are received in one repetition of the transmission at which time a "registration complete" signal is sent to the transmitting station to halt the repetitive transmission of the called designation. One such selective signaling system is disclosed in Patent 2,778,878 of W. A. Malthaner and H. E. Vaughan issued January 22, 1957.

Known selective signaling systems, although effective to transmit coded electrical impulses via noisy transmission media, have inherent disadvantages. Because such systems depend upon the reception of plausible codes for a complete designation before registering any of the individual parts or digits thereof, many repetitive transmissions of the complete designation may be required. This will be particularly true where the number of digits in a designation is large or where signal-to-noise ratios are extremely poor. For example, if the probability of receiving a single bit (binary digit) in the presence of a particular noise level is 0.9, the probability of receiving a designation of three decimal digits of five bits each and a start indication of five bits in a self-checking code with a single transmission may be only $(0.9)^{20}$ or 0.12. This of course is an intolerable condition. However, with thirty repetitions of the transmission the probability of receiving at least one complete satisfactory code may be of the order of 0.98. It will be observed that if the assumed noise level increases then the number of repetitions required must increase in order to insure the probability 0.98 of receiving at least one complete plausible three digit designation. Similarly, if the number of digits in the designation is increased, the number of repetitions must also be increased to insure the same probability of receiving at least one complete plausible designation. The necessity under certain signal-to-noise transmission conditions or the necessity of transmitting designations comprising a relatively large number of digits requires that many repetitive transmissions of the complete designation be made. This of course increases the holding time of the transmitting apparatus and receiving apparatus and may necessitate provision of additional sets of apparatus where the message rate is relatively high.

A further disadvantage of known selective signaling systems of the type described above is that the apparatus for transmitting a "registration complete" signal at a called station to associated receiving apparatus at a calling station to indicate that the designation repetitively transmitted from the calling station has been received and registered at the called station further increases the cost and complexity of these systems. In addition, prior selective signaling systems also employ large numbers of relays or electromechanical switches or electron discharge devices and such arrangements are generally bulky, consume considerable power and are subject to maintenance difficulties. These are also relatively slow operating devices which place a maximum limit on the signaling speed (bits per second) and correspondingly increase the signaling time.

It is an object of the present invention to decrease the signaling time of selective signaling systems and concomitantly increase the reliability and accuracy thereof.

It is also an object of this invention to effect the transmission of coded electrical impulses between stations in a selective signaling system with fewer repetitive transmissions of the coded electrical impulses than heretofore required.

Further objects of this invention are to reduce the physical size, to reduce the complexity, to reduce the cost of fabrication and maintenance, and to reduce the power requirements of selective signaling systems.

An additional object of the present invention is the provision of an improved flexible selective signaling system wherein the signaling speed (bits per second), the number of bits in the selective code designations to be transmitted, the number of repetitive transmissions of the selective code designations and the transmission bandwidth may advantageously be adjusted to meet required transmission conditions.

These and other objects are attained in one specific illustrative embodiment of a selective signaling system in accordance with the present invention wherein a reentrant magnetic core shift register at a calling station of the system repetitively generates in succession, a start code and signal code comprising a plurality of selectable digit codes. The repetitively generated start code and signal code are transmitted to a calling station of the system where the successively received signal bits of the start and digit codes are shifted from stage to stage in a magnetic core shift register. Sufficient stages are provided in the shift register to store the start code preceding the digit codes, the digit codes and the start code preceding the next repetitive transmission of the digit codes.

The signal bits in the various stages in the shift register are continuously examined for the presence of a valid start code indicating that the digit codes have been shifted into stages of the shift register assigned thereto. Outputs from the individual stages of the shift register are checked to determine the plausibility of the stored start codes and digit codes, and if at least one valid start code is detected during any repetition of the received signal code any individual digit code which passes a plausibility check will be registered in an associated register assigned thereto. On each succeeding repetition of the received start code and signal code the start code and digit codes of the signal code are again checked for plausibility and any of the individual digit codes which pass a plausibility check are individually registered in associated registers assigned thereto.

Reception of the same individual valid digit code on a subsequent repetition of the received signal code will have no effect on the corresponding previously stored digit code unless the digit codes do not agree. Lack of agreement will cancel the recording of this particular digit code, will block its storage on subsequently received repetitions of the signal code and prevent its transfer to a utilization circuit.

The number of repetitions of the start and digit codes transmitted from a calling station to a called station in the selective signaling system of the present invention is advantageously predetermined to obtain a required degree of reliability. Accordingly, no "answer back" or "registration complete" signal is transmitted from a called station to a calling station of the system to indicate when the digit codes have been registered. In lieu of such a signal, the number of repetitions of the start and digit codes is selected with sufficient margin to assure the probability that all of the digit codes will be registered when the repetitive transmission thereof is complete. The number of repetitive transmissions required is determined from known factors such as the noise level of the transmission medium, the transmission bandwidth, the number of digits in the signal code, the required signaling speed, and the required signaling time.

Returning to the above-given example where the probability of receiving a single bit (binary digit) in the presence of a particular noise level is 0.9, and the probability of receiving three decimal digits of five bits each and a start indication of five bits in a self-checking code with thirty repetitive transmissions was determined to be 0.98, if the above method of transmission is modified in accordance with the present invention so that the reception of a complete plausible signal code on any repetitive transmission is not required before accepting information, the number of repetitive transmissions may be reduced considerably or the reliability of reception vastly improved. By registering any digit which passes a plausibility check on any repetition of the signal code, the number of repetitive transmissions may be reduced from thirty to twelve and still maintain the same probability 0.98 of receiving one complete signal code. By utilizing thirty repetitive transmissions of the signal code, reliability is improved where only one failure to receive a complete signal code should occur in 100,000 connections. Thus the selective signaling system of the present invention may andvantageously operate in a transmission medium where higher noise levels are prevalent or the number of required repetitive transmissions of the complete signal code may advantageously be reduced.

Further, in accordance with the present invention, because a start code precedes each repetitive transmission of the digit codes, the start code both preceding and following the digit codes is advantageously examined for plausibility, and if either of the start codes passes the plausibility checking requirements any digit codes which also check as plausible are recorded. This will permit a further reduction of about 25 percent in the number of repetitive transmissions of the complete signal code required to maintain the same degree of reliability or will provide additional improvement in reliability with the same number of repetitive transmissions of the signal code.

It is a feature of the present invention to check the plausibility of individual digit codes of a repetitively received plural digit signal code and to register any individual digit code passing the plausibility check on any repetition of the received signal code.

It is a further feature of the present invention to check the plausibility of the start code both preceding and following a repetitively received plural digit signal code as well as the individual digit codes thereof and when at least one of the start codes is determined to be plausible on any repetition of the received signal code to register any individual digit codes also determined to be plausible.

It is also a feature of the present invention to cancel the registration and block the subsequent registration of any individual digit code of a repetitively received plural digit signal code when the individual digit code received on a prior repetition of the signal code passed a plausibility check and was registered but does not agree with the corresponding digit code also passing a plausibility check on a subsequent repetition of the received signal code.

It is another feature of the present invention to utilize magnetic cores having substantially rectangular hysteresis loop characteristics to repetitively generate in succession a start code and a plural digit signal code, to detect a repetitively received start code and plural digit signal code, to check the plausibility of the start code and the individual digit codes on each repetition of the received plural digit signal code and to register any individual digit code passing the plausibility check on any repetition of the received signal code.

Figure 2:
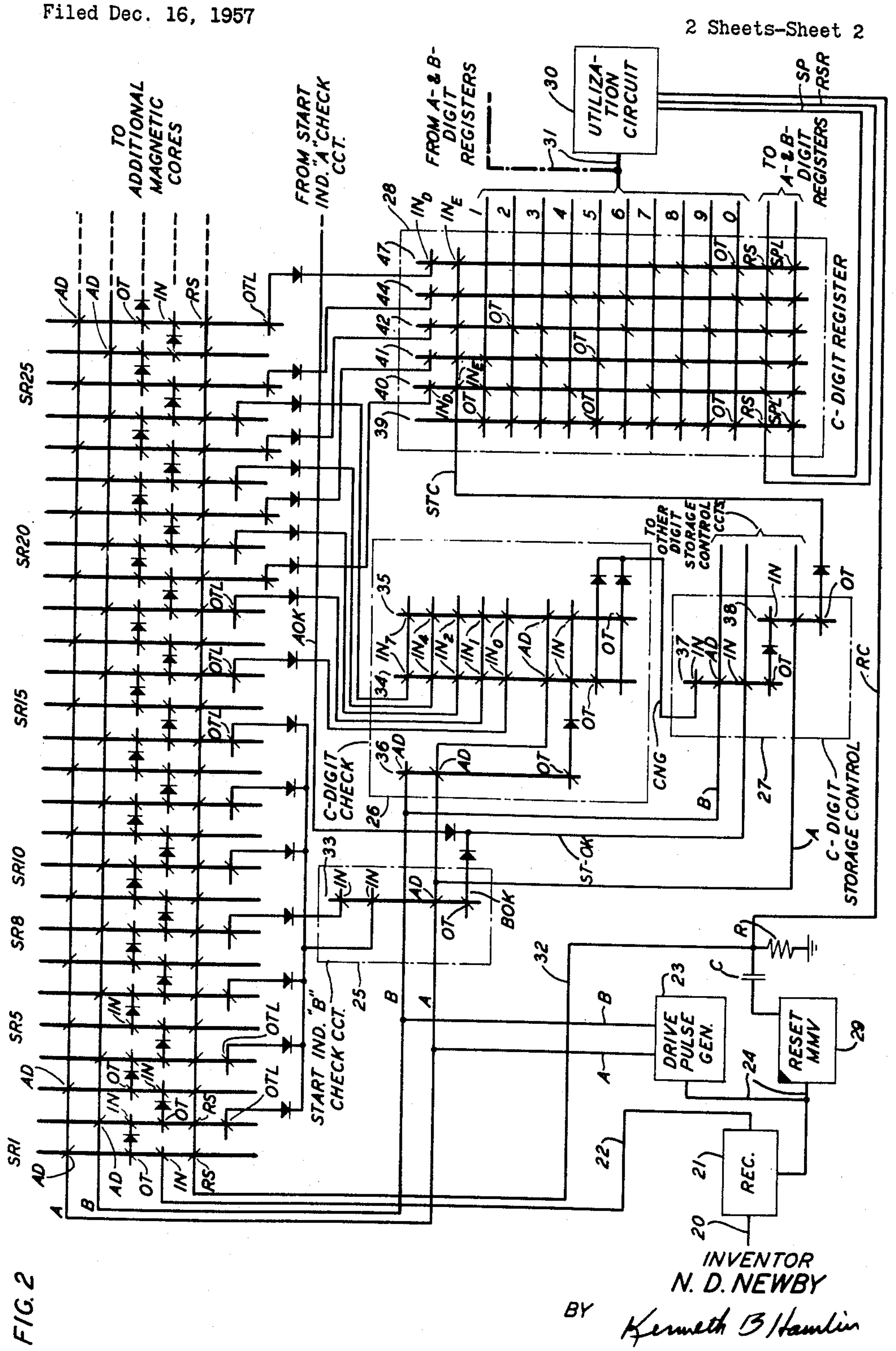

The foregoing and other objects and features of the present invention will be more readily understood from the following description of an illustrative embodiment thereof when read in reference to the accompanying drawing in which:

Fig. 1 is a schematic representation of the signal generating components of one specific illustrative embodiment of the selective signaling system of the present invention; and Fig. 2 is a schematic representation of the signal receiving components of one specific illustrative embodiment of the selective signaling system of the present invention.

The specific illustrative embodiment of the selective signaling system of the present invention disclosed in the drawing advantageously utilizes magnetic cores having substantially rectangular hysteresis loop characteristics. The signal generating portion of the present invention comprises a plurality of such cores connected in a two-core per stage reentrant shift register, and the signal receiving portion of the present invention comprises a plurality of such cores connected in a two-core per stage non-reentrant shift register for temporary storage of the received signal bits and a further plurality of such cores utilized for checking the plausibility of the received start codes and digit codes and for storage of the plausible digit codes.

Magnetic cores with appropriate windings are ideal circuit elements. They are passive, they are small in size, they have unlimited life and require no maintenance. While passive in nature, magnetic cores can produce gain in a circuit where gain is defined as the ratio of the power output to the power required for storing a signal when all secondary windings are either open or high impedance. When the magnetic state of a core is changed from one polarity to another by current in a primary winding, the structure behaves like an ideal transformer. A load connected to a secondary winding is connected to the generator in the primary winding and the power delivered to the load is controlled by the impedance match between the generator and the load.

Before proceeding to a detailed description of the present invention, the core symbolism advantageously utilized to depict the illustrative embodiment thereof will be briefly described. In the schematic presentation of this illustrative embodiment, magnetic cores are depicted in a "mirror symbol" representation. These mirror symbols are described in an article entitled "Pulse Switching Circuits Using Magnetic Cores" by M. Karnaugh, published in the Proceedings of the Institute Radio Engineers, volume 43, No. 5, May 1955, pages 570 through 583.

As shown in the drawing, the magnetic cores are represented by vertical lines with leads to the windings thereon indicated as horizontal lines crossing the core symbols. For example, in Fig. 1 the vertical line designated C0 represents a magnetic core having a substantially rectangular hysteresis loop characteristic, and the lines designated 0, 3, 5, 6, 8 and 9, et cetera, represent leads to windings inductively coupled to this magnetic core. The presence of a winding on a magnetic core is indicated by a short diagonal bar at the junction of the core and lead symbol, the angle indicating the winding direction. Current is always assumed to flow from left to right, the return path of the current being omitted. The diagonal bar is known as a "mirror symbol" and a pulse over an incoming lead is said to be reflected off the winding bar either upward or downward. If of sufficient amplitude to saturate the core an upward reflection is said to store the binary digit or bit "1," and the downward reflection is said to store the binary digit or bit "0." The direction of currents in other windings on the same core, due to transformer action, is found by assuming that this input pulse, after first being reflected by the winding bar, passes either up or down the core and is again reflected off the end of the core symbol, its direction thus being reversed. The pulse traveling in the reverse direction hits each winding bar and is reflected in the direction that currents, due to transformer action, would follow. The hysteresis loop characteristic of these cores is substantially rectangular and accordingly is such that if the cores are saturated by I ampere turns, *I*/2 ampere turns will cause a negligible change in flux either of a transient or permanent nature regardless of the polarity. The turns ratio of a winding with respect to the other winding on the same magnetic core is such as to cause the circuit to operate in the manner to be described and depends upon the type of core and diode utilized therewith.

Referring now to the drawing, a specific illustrative embodiment of a selective signaling system in accordance with the present invention will be described in detail. The signal generating components of the present invention are shown in Fig. 1 and are arranged to repetitively generate a selective signal comprising three digits in a 3-out-of-5 sequential pulse position code which is preceded by a start indication in a 1-out-of-7 pulse position code. The 3-out-of-5 code fills 3-out-of-5 signal spaces with marks as follows:

| Code Element | 0 | 1 | 2 | 4 | 7 |
|---|---|---|---|---|---|
| Numerical Digit: | | | | | |
| 1 | 0 | 0 | 1 | 1 | 1 |
| 2 | 0 | 1 | 0 | 1 | 1 |
| 3 | 1 | 0 | 0 | 1 | 1 |
| 4 | 0 | 1 | 1 | 0 | 1 |
| 5 | 1 | 0 | 1 | 0 | 1 |
| 6 | 1 | 1 | 0 | 0 | 1 |
| 7 | 0 | 1 | 1 | 1 | 0 |
| 8 | 1 | 0 | 1 | 1 | 0 |
| 9 | 1 | 1 | 0 | 1 | 0 |
| 0 | 1 | 1 | 1 | 0 | 0 |

It will be noted that the above 3-out-of-5 code is the reciprocal of the conventional 2-out-of-5 code. The 1-out-of-7 sequential pulse position code utilized as a start indication in the illustrative embodiment of the present invention comprises three spaces, a mark and three spaces (0001000). It is to be understood that the number of digits generated by the signal generator of Fig. 1 and the codes utilized in repetitively generating these digits are illustrative only as any number of digits and any suitable codes therefor may advantageously be utilized. For example, if a larger numerical base is necessary a 4-out-of-6 or a 4-out-of-7 code may be utilized.

The signal generator of the present invention includes a group of magnetic cores for each of the digits of the selective signal to be repetitively generated and a group of magnetic cores for the start indication. The C-digit cores are shown in Fig. 1 and are designated C0, C0′, C1, C1′, C2, C2′, C4, C4′, C7 and C7′. A similar group of cores (not shown in the drawing) is also provided for the A- and B-digits respectively of the selective signal to be repetitively generated. A group of cores is also provided for the start indication which is repetitively generated preceding each repetition of the digit codes. As shown in Fig. 1 these cores are designated S1, S1′, S2, S2′, S3, S3′, S4, S4′, S5, S5′, S6, S6′, S7 and S7′. The cores for the A-, B- and C-digits and the start indication are connected in a reentrant two-core per stage shift register as shown in Fig. 1. Each of the cores in the reentrant shift register has inductively coupled thereto one or more input windings designated IN, an advance winding designated AD, an output winding designated OT and a reset winding designated RS. Core S7 has an additional output winding designated OTT which is connected through a diode via lead 10 to transmitter 11 and comprises the output for the repetitively generated start and digit codes. Output winding OT on core S7′ is connected to the input winding IN on core C0 by lead 12 thus making the shift register reentrant.

Each of the groups of cores for the respective digits of the signal to be generated are connected by means of ten input leads to a digit input circuit. For example, the input leads connected to the input windings IN of the C-digit cores are designated 0 through 9 as shown in Fig. 1 and connect to the C-digit input circuit 13. Similar input leads and input circuits (not shown in Fig. 1) are provided for the A- and B-digit cores. The seven bit start indication (0001000) is stored in the start indication cores S1 . . . S7′ when a reset pulse from reset pulse source 14 is applied over reset lead 15. It will be noted that all of the reset windings RS on the start indication cores are wound in such a direction as to restore all of the cores to the unset or "0" state except core S4 which is placed in its set or "1" state by a pulse over reset lead 15 from reset pulse source 14.

A numerical digit is stored in the reentrant shift register by applying a pulse from a digit input circuit over one of the ten input leads extending to the group of cores associated with the particular digit. For example, a numerical digit is stored in a 3-out-of-5-code in the C-digit cores by applying a pulse from the C-digit input circuit 13 over one of the ten input leads 0 through 9, each of which is connected to respective input windings IN of the C-digit cores to produce the required 3-out-of-5-code pattern for the C-digit. In a similar manner the A-digit and the B-digit of the selective signal are entered into the reentrant shift register from a B-digit input circuit and an A-digit input circuit to the A- and B-digit groups of cores (not shown in Fig. 1).

Two cores are provided for each signal bit of the digit codes and start indication code stored in the reentrant shift register. Drive pulses on leads A and B from drive pulse source 16 are alternately applied to advance windings AD on the cores to cause the stored signal bits to be circulated around the reentrant shift register as long as desired. Timer 17 is connected to drive pulse source 16 via leads in a cable designated 18 and counts the number of drive pulses alternately applied to leads A and B. In a manner known in the art timer 17 controls drive pulse source 16 to halt the application of the alternate drive pulses after a predetermined number of such pulses have been applied to the cores of the reentrant shift register. Thus the number of repetitions of the start and digit codes generated by the selective signal generator of Fig. 1 is advantageously determined by the number of drive pulses alternately applied to leads A and B. Timer 17 is also connected to reset pulse source 14 via leads in a cable designated 19 and after the predetermined number of drive pulses have been alternately applied to the A and B leads and the repetitive generation of the stored signal codes is halted, reset pulse source 14 will be controlled in a manner known in the art by timer 17 to apply a reset pulse over reset lead 15, to erase the stored signal codes in the A-, B- and C-digit cores, and to reset the start indicator cores to store the seven bit start indication code, 0001000.

Assume that the three digit code to be repetitively generated by the selective signal generator of Fig. 1 comprises the numerical digits 452 for the A-, B- and C-digits respectively. The digit 2 is stored in the C-digit cores by applying a pulse from C-digit input circuit 13 over the 2 lead to the C-digit cores. This pulse will cause cores C1, C4 and C7 to be driven to their set or "1" state. In a similar manner the digits 4 and 5 are set in the A-digit cores and B-digit cores respectively (not shown in the drawing). After the numerical designation has been set in the reentrant shift register, drive pulse source 16 is energized to alternately apply drive pulses over the A and B leads. The drive pulses are each of sufficient amplitude to saturate a core.

The operation of the shift register circuit of Fig. 1 will now be described with respect to core C1, the operation of the cores C4 and C7 being identical. When the shift register is stepped, the circuit operation desired is to return core C1 to the normal "0" state and simultaneously set the core C1′ to the "1" state. When a drive pulse is applied to lead A from drive pulse source 16 the current is reflected downward on core C1 and thus changes the state of core C1 from "1" to "0." This downward pulse is reflected upward from the lower end of core C1 symbol and is in turn reflected from each winding bar symbol into connecting circuits according to the assumed symbolism. Reading upward from the bottom of core C1, the first circuit affected is the reset circuit. Negligible current will flow to the left over reset lead 15 because reset pulse source 14 is a high impedance circuit. The next circuit affected is the coupling to the preceding C0′ core. Current will flow toward the right and will pass through the diode in the coupling circuit. However, it will have no effect on the C0′ core because the generated voltage will product less than half the ampere turns necessary for saturation of the C0′ core due to the turns ratio of the windings thereon and the forward resistance of the diode in the coupling loop.

The next winding, output winding OT, is the only work circuit on core C1. As shown in Fig. 1, output winding OT on core C1 is part of the coupling circuit to the input winding IN on the following C1′ core. Current flows in the forward direction through the diode as indicated by the winding bar with an amplitude sufficient to saturate the C1′ core to state "1." The "1" stored in the C1 core is thus advanced one step to the C1′ core. Due to the change of state of the C1′ core, currents in turn will tend to flow in all of its windings due to transformer action as will be described hereafter.

Returning again to the C1 core and the pulse reflected from the bottom thereof by the drive pulse on lead A, the next circuit affected by the pulse will be the drive circuit itself and the pulse will cause a back EMF to be generated in the A lead. However, due to the high impedance of drive pulse source 16, negligible current will flow. Continuing up core C1, the next circuits affected by the reflected pulse are the digit input circuits, and because the C-digit input circuit 13 is a high impedance circuit, negligible currents will flow in the forward direction in the signal input leads.

When the state of core C1′ is changed from "0" to "1," as described above, it is necessary to prevent current flow in the other windings in order to minimize the amount of power which must be supplied by core C1. All of the circuits connected to core C1′ are high impedance or have a diode connected in series as is shown for the coupling circuit to core C2. The current pulse from core C1 which set core C1′ to state "1" is reflected from the winding bar upward on core C1′ and is then reflected from the end of core C1′ downward to the winding bar of coupling circuit to core C2. Here it is reflected to the left. However, current cannot flow in this direction because it is blocked by the diode in the coupling circuit between cores C1′ and C2. The only other circuits coupled to core C1′ are the advance circuit and reset circuit both of which as indicated above are high impedance circuits and accordingly negligible current will flow therein.

When a drive pulse is subsequently applied to lead B from drive pulse source 16 current is reflected downward on core C1′ and thus changes the state of core C1′ from "1" to "0." This downward pulse is reflected upward from the lower end of core C1′ and in turn reflected from each winding bar into the connecting circuits according to the assumed symbolism. Reading upward from the bottom of core C1′ the first circuit affected is the reset circuit. As indicated hereinbefore, negligible current will flow to the left over reset lead 15 because reset pulse source 14 is a high impedance circuit. The next circuit affected is the only work circuit on core C1′. As shown in Fig. 1, the output winding OT of core C1′ is part of the coupling circuit to the following input winding IN on core C2. Current flows in the forward direction through the diode as indicated by the winding bar with an amplitude sufficient to saturate core C2 to state "1." The "1" stored in core C1′ is thus advanced one step to the C2 core.

The next circuit affected by the upwardly reflected pulse on core C1′ is the coupling circuit to the preceding C1 core. Current will flow toward the right and will pass through the diode in the coupling circuit. However, it will have no effect on the C1 core because the generated voltage will produce less than half the ampere turns necessary for the saturation of the C1 core due to the turns ratio of the winding and the forward resistance of the diode.

All "1's" stored in the reentrant shift register are simultaneously under the control of the driving pulses alternately applied to the A and B leads and therefore any pattern of signals which has been stored will be advanced step by step through the stages of the shift register without change in the manner above described. Because the shift register is reentrant, the signal bits obtained from the output winding OT on core S7′ are reinserted via lead 12 through the input winding IN on core C0, and the signal bits will be recirculated through the stages of the shift register as long as alternate drive pulses are applied to leads A and B.

Core S7 has an additional output winding designated OTT which is connected through a diode via lead 10 to transmitter 11. Accordingly, when the state of core S7 is changed from the set or "1" state to the unset or "0" state by a drive pulse applied to lead A from drive pulse source 16, an output pulse will be applied through the diode in the output circuit over lead 10 to transmitter 11. In response to each output pulse on lead 10, transmitter 11 will transmit a signal pulse via transmission medium 20 to the called station in the selective signaling system of the present invention. These signal pulses will be transmitted in phase with the drive pulses applied to lead A from drive pulse source 16.

As described hereinbefore, timer 17 controls the number of repetitive transmissions of the start indication code and digit codes made to the receiving station and this required number is advantageously predetermined from known factors to assure a desired degree of reliability of reception. After completion of the required number of repetitive transmissions, timer 17 controls drive pulse source 16 to halt the application of the alternate drive pulses to the reentrant shift register of Fig. 1 and controls reset pulse source 14 to effect the resetting of the reentrant shift register to normal.

Various methods well known in the art may advantageously be utilized in the combination of the present invention to effect the transmission of the repetitively generated start and digit codes obtained from the output of the reentrant shift register of Fig. 1. Transmission medium 20 between a calling and a called station in the signaling system of the present invention may, for example, comprise metallic transmission lines in which case transmitter 11 may advantageously apply, in a manner known in the art, a direct current voltage pulse of predetermined duration or an alternating current voltage signal of predetermined duration to the metallic lines in response to each pulse on lead 10 from the reentrant shift register shown in Fig. 1. Transmission medium 20 may, for example, also comprise a radio channel in which event the pulses on output lead 10 from the reentrant shift register may be advantageously utilized in a manner known in the art to pulse code modulate a voice frequency carrier. The pulse code modulated carrier may then be impressed upon the speech input of the radio transmitter such as transmitter 11 for transmission to a called station.

The signal receiving components of the present invention are depicted schematically in Fig. 2 of the drawing. Receiver 21 shown in Fig. 2 responds to the signals transmitted via transmission medium 20 from transmitter 11 shown in Fig. 1. In reality receiver 21 is a signal regenerator which responds to the received signals and provides output pulses corresponding to the time pattern of the original pulses applied to lead 10 from the output of the reentrant shift register shown in Fig. 1. In the event that transmission medium 20 comprises metallic transmission lines as suggested above, receiver 21 will advantageously comprise pulse detecting circuits, amplifier circuits and pulse forming circuits all known in the art. On the other hand, if transmission medium 20 comprises a radio channel also as suggested above, receiver 21 will advantageously comprise filter circuits, a demodulator circuit, amplifier circuits and pulse generating circuits also known in the art.

The successive signal bits received by receiver 21 are stored in a temporary store which in the illustrative embodiment of the present invention as shown in Fig. 2 comprises a plurality of magnetic cores designated SR1 . . . SR10 . . . SR25, et cetera, connected in a non-reentrant two-core per stage shift register. Sufficient stages are provided in this shift register to temporarily store the start indication code received ahead of the three digit codes comprising the signal code, the three successively received digit codes and the start indication code received following the three digit codes. As shown in Fig. 2 each of the magnetic cores in the non-reentrant shift register has inductively coupled thereto an input winding designated IN, an output winding designated OT, an advance winding designated AD, and a reset winding designated RS. In addition, the even-numbered cores SR2, SR4, SR6, et cetera, have inductively coupled thereto an additional output winding designated OTL which is connected through a diode to a load. This load, as shown in Fig. 2, comprises another magnetic core.

The signal pulses from the output of receiver 21 are applied via lead 22 to the input winding IN of core SR1. The shifting of the successively received signal bits from stage to stage in the non-reentrant shift register of Fig. 2 is accomplished in the manner described for the reentrant shift register of Fig. 1 by advance pulses supplied alternately to leads A and B from the output of drive pulse generator 23.

Drive pulse generator 23 may advantageously comprise any of the various circuits known in the art for producing alternate pulses on lead A and B, which pulses are synchronized with the output pulses from receiver 21 so that the drive pulses applied to lead B are in phase with the signal pulses applied to the input of the shift register. For example, drive pulse generator 23 may advantageously comprise, as well known by those skilled in the art, a bit frequency oscillator tuned to oscillate at the bit frequency of the signal pulses received by receiver 21. The oscillation of this oscillator may advantageously by synchronized with the bit frequency of the received signal pulses by utilizing the well known "flywheel" principle where synchronizing pulses corresponding in phase with the received signal pulses are applied via lead 24 from receiver 21 to drive the oscillator. The output signal from the bit frequency oscillator is thereafter shifted in phase, clipped, differentiated, summed and amplified in a manner known in the art to apply alternate drive pulses to the A and B leads connected to the advance windings of the shift register of Fig. 2 with the phasing as indicated above.

The received signal bits are, in the manner described hereinbefore, continuously stepped from stage to stage in the non-reentrant shift register of Fig. 2 and are continuously examined for the presence of the three digit codes and either of two start indication codes. A start indicator B check circuit designated 25 is provided for checking the plausibility of the start indication code following the reception of the three digit codes. A similar start indicator A check circuit (not shown in the drawing) is also provided for checking the plausibility of the start indication code preceding the received digit codes. The purpose of these check circuits is to continuously examine the signal bits temporarily stored in the shift register of Fig. 2 to determine when a plausible start indication code is stored in respective magnetic cores associated therewith.

Three digit check circuits are also provided each of which checks the plausibility of a respective digit of the repetitively received digit codes. A C-digit check circuit designated 26 is shown in Fig. 2 of the drawing. Similar check circuits, not shown in the drawing, are provided for the B-digit and the A-digit of the received signal code. Each digit check circuit in the illustrative embodiment of the present invention in turn controls a digit storage control circuit which is operative when at least one start indication code checks as plausible and the associated digit code is plausible to control the recording of the received digit in a digit register. As shown in Fig. 2, the C-digit storage control circuit is designated 27 and controls the transfer of a valid C-digit, in the manner to be described hereinafter, from the shift register to a C-digit register designated 28 in Fig. 2. Similar digit storage control circuits and digit registers (not shown in the drawing) are provided in the illustrative embodiment of the present invention for the B-digit and the A-digit of the repetitively received three digit codes.

A reset circuit designated 29 in Fig. 2 of the drawing is provided to apply a reset pulse over the lead 32 connected to the reset winding RS on each of the cores of the non-reentrant shift register of Fig. 2 to clear all of the stages of the shift register after reception of the repetitively received three digit signal codes is completed. Reset circuit 29 also provides a pulse over the RC registration complete lead to utilization circuit 30 to indicate that the registration of the three digits of the repetitively received digit code is completed.

Utilization circuit 30 in response to the registration complete signal on the RC lead will in a manner well known in the art apply a spill signal over the SP lead to the A-, B- and C-digit registers which will cause the digit codes stored therein to be transferred from the respective digit registers to utilization circuit 30 via leads in cable 31. After the completion of the transfer of the respective digit codes from the respective digit registers to utilization circuit 30 has been completed, utilization circuit 30 will then apply a pulse over the RSR reset register lead to reset to normal the respective digit registers.

Turning now to Fig. 2 of the drawing, the operation of the receiving components of the present invention will be described in detail. Signal pulses on output lead 22 from receiver 21 if present will be coincident with driving pulses applied to lead B from drive pulse generator 23. The output signal pulses are applied to input winding IN on core SR1 in the first stage of the non-reentrant shift register. These signal pulses will be of sufficient amplitude to cause core SR1 to be driven to its set or "1" state. The following drive pulse on lead A from drive pulse generator 23 will transfer this stored signal bit from core SR1 to core SR2 in the manner previously described for the reentrant shift register of Fig. 1. Thereafter this signal bit is advanced through the successive stages of the shift register along with other successively received signal bits under the alternate control of the drive pulses on lead A and lead B from drive pulse generator 23. The pattern of the signal bits stored in the shift register should be exactly the same as the pattern generated by the reentrant shift register of Fig. 1 except for mutilations suffered during the transmission.

Any of the cores SR- of the shift register of Fig. 2 having its magnetic state changed from the "1" condition to the "0" condition will produce a secondary voltage which will pass current through any connected diode and load. As shown in Fig. 2, the load in each case is another magnetic core. This curernt will have sufficient amplitude to saturate this core in the direction indicated by the winding bar symbol unless currents are simultaneously present in other windings.

Output voltages from the non-reentrant shift register stages which are used for checking the plausibility of the start and digit codes are coincident with each drive pulse applied to lead B from drive pulse generator 23. Whatever signal bits are stored in the stages of the shift register on the even-number cores SR2, SR4, et cetera, will be impressed on the start indication and digit check circuits. The shift register will be filled by the reception of the start indication code preceding the three digits (herein called the start indication A), the three digit codes and the start indication code (herein called the start indication B) following the three digit codes. Start indication B following one group of digits is of course checked later as the start indication A preceding the next group of digits repetitively received. Whenever a valid start indication code is recognized, as will be described hereinafter, it immediately identifies by location all other signal bits stored in the shift register.

The start indication B check circuit 25, which as shown in Fig. 2 comprises core 33, checks the validity of the start indication B code and on identical start indication A check circuit (not shown in the drawing) checks the validity of the start indication A code. These two check circuits, the start indication B check circuit and the start indication A check circuit, each test for the presence of the signal bit combination 0001000 for every drive pulse on the B lead. Whenever a satisfactory check is made in the start indication B check circuit 25, a pulse is delivered by core 33 from the output winding OT through a diode over the BOK lead to the start indication check lead ST–OK. Similarly, when the start indication A is checked as valid a pulse will be delivered via the AOK lead through a diode to the ST–OK lead. A pulse from core SR8 of the shift register under control of a drive pulse on the B lead from drive pulse generator 23 and the absence of pulses from cores SR2, SR4, SR6, SR10, SR12 and SR14 will cause core 33 to produce an output pulse. The signal pulse from core SR8 is applied to an input winding IN on core 33 and causes core 33 to be driven to its set or "1" state unless a signal pulse is simultaneously produced by one or more of the other of the six cores SR2, SR4, SR6, SR10, SR12 and SR14 and applied to the other input winding IN on core 33. A signal from one or more of the above-mentioned six cores will hold core 33 in the "0" state due to the turns ratio of the input windings. If core 33 has been set to the "1" state, the following drive pulse on lead A will return it to state "0" simultaneously producing a check OK output pulse on the BOK lead. The operation of the start indication A check circuit is identical to that described above and pulses from either of the BOK or AOK leads will pass through diodes connected therein to apply a signal pulse to the ST–OK lead. These two diodes serve as an OR gate so that a pulse on either one or both of the BOK and AOK leads will provide a pulse on the ST–OK lead. A signal pulse present on the ST–OK lead indicates that at least one start indication code checks as plausible and that the signal bits which comprise the A-, B- and C-digit codes have been shifted to stages in the shift register assigned thereto.

Simultaneously with the checking of the signal bits successively shifted from stage to stage in the non-reentrant shift register of Fig. 2 by start indication B check circuit 25 and the start indication A check circuit (not shown in the drawing), the A-, B- and C-digit check circuits also check the shifted signal bits to detect valid digit codes. When a plausible start indication code is detected by either the start indication B check circuit 25 or the start indication A check circuit, the signal bits for the A-, B- and C-digits will be stored in stages of the non-reentrant shift register assigned thereto. For example, the signal bits of the C-digit for any repetition of the received signal codes will be stored on cores SR16, SR18, SR20, SR22 and SR24 shown in Fig. 2 at the time a start indication is stored in cores SR2, SR4, SR6, SR8, SR10, SR12 and SR14, or the corresponding cores at the end of the reentrant shift register. The signal bits representing the C-digit of the repetitively received signal code are checked by C-digit check circuit 26 for plausibility.

As shown in Fig. 2, C-digit check circuit 26 comprises magnetic cores 34, 35 and 36. Similar check circuits not shown in the drawing check the signal bits stored in the shift register for the B-digit and the A-digit of the repetitively received signal code. Core 34 of C-digit check circuit 26 checks to determine if less than three bits are stored in the 3-out-of-5 code in these respective cores, and core 35 checks to see if more than three bits are stored in the 3-out-of-5 code in these respective cores. If the digit pattern stored in cores SR16, SR18, SR20, SR22 and SR24 is not exactly three bits out of five, one of cores 34 or 35 will be set to state "1" and will in the manner described below produce a "no check" output pulse on the CNG lead.

The circuit operation for a satisfactory digit check requires that an unbalance between the ampere turns tending to set one of the cores 34 or 35 to state "1" and the ampere turns simultaneously tending to set it to state "0," its normal condition, shall not be greater than I/2. Because these opposing ampere turns must match both in amplitude and time, the currents are produced in a similar manner. One input to cores 34 and 35 occurs when a drive pulse on lead B sets the cores in the non-reentrant shift register associated with the C-digit to state "0." The other input to cores 34 and 35 occurs when core 36 in the C-digit check circuit 26 is set to "0" by the same drive pulse on the B lead, core 36 having been previously set to state "1" by the preceding drive pulse on lead A. It will be noted that when core 36 is set to its "1" condition by a drive pulse on lead A the diode in series with the output winding OT on core 36 blocks current flow in the input windings IN of cores 34 and 35.

Assume, for example, that the C-digit of the repetitively received signal code is the numeral 0 which as indicated hereinbefore will be represented by signal bits or marks being present in the 0, 1 and 2 code elements and the absence of signal bits or marks in the 4 and 7 code elements. Accordingly, with this assumed condition, cores SR16, SR18 and SR20 will be set to the "1" state while cores SR22 and SR24 will remain in their "0" state. When a drive pulse applied to lead B from drive pulse generator 23 causes cores SR16, SR18 and SR20 to be set to their "0" state, current will flow in the output windings OTL on each of these cores through the diodes in the output leads and through input windings $IN_0$, $IN_1$ and $IN_2$ on cores 34 and 35. The current in these windings will tend to set core 34 to its "0" state and tend to set core 35 to its "1" state. The same drive pulse applied to lead B will cause core 36 in C-digit check circuit 26 to be set to "0" which in turn will cause current to flow in the output winding OT on core 36, through the diode in the output lead and in the input winding IN on each of cores 34 and 35. On core 34 this current will tend to set core 34 to its "1" state while on core 35 this current will tend to set core 35 to its "0" state. Accordingly, the current in windings $IN_0$, $IN_1$ and $IN_2$ on core 34 tending to set core 34 to its "0" condition is opposed by the current in the IN winding of core 34 which tends to set this core to its "1" condition. If less than three of the input windings $IN_0$, $IN_1$, $IN_2$, $IN_4$ and $IN_7$ on core 34 are energized, core 34 will be driven or set to its "1" state. At the same time, the current in windings $IN_0$, $IN_1$ and $IN_2$ on core 35 tending to set core 35 to its "1" state is opposed by the current in the IN winding of core 35 which tends to set core 35 to its "0" state. If more than three of the input windings $IN_0$, $IN_1$, $IN_2$, $IN_4$ and $IN_7$ on core 35 are energized, core 35 will be driven or set to its "1" state. If exactly three of the respective input windings $IN_0$, $IN_1$, $IN_2$, $IN_4$ and $IN_7$ on cores 34 and 35 are energized then neither of the cores 34 or 35 will be set to its "1" state. Accordingly, when the succeeding drive pulse on lead A is applied to the advance winding AD on cores 34 and 35, if either of these cores is set to its "1" state indicating on the one hand that less than three bits were detected, or on the other hand that more than three bits were detected, an output pulse will be applied through a diode to the CNG lead indicating that the C-digit recorded in the respective cores of the shift register is an invalid digit.

Each of the digit check circuits in the illustrative embodiment of the present invention controls an associated digit storage control circuit. As shown in Fig. 2 of the drawing, C-digit check circuit 26 controls C-digit storage control circuit 27. C-digit storage control circuit 27 comprises two magnetic cores 37 and 38. One input winding IN of core 37 is connected to the CNG lead which as indicated above will have a pulse applied thereto when an invalid C-digit is detected. Another input winding IN on core 37 is connected to the ST–OK lead which as indicated hereinbefore will have a pulse applied thereto when at least one valid start indication code is detected. Core 37 will be driven to its "1" state by a signal pulse on the ST–OK lead provided that a signal pulse on the CNG lead is not simultaneously received from the C-digit check circuit 26. A "no check" pulse on the CNG lead will be in phase with the check OK pulse on the ST–OK lead if one is present. With core 37 driven to its "1" state a drive pulse on lead B will return core 37 to its "0" state and simultaneously produce an output pulse from its output winding OT through a diode to the input winding IN of core 38. When a "no check" pulse is present on the CNG lead, core 37 will be held to its "0" state due to the turns ratio of the respective windings on this core, and in this case a drive pulse on lead B will produce no output pulse from core 37 to the input winding of core 38. The output pulse obtained from the output windings OT of core 37 could advantageously be utilized to control or enable the C-digit register circuit 28. This, however, would require some of the cores in the non-reentrant shift register to simultaneously supply energy for both checking and digit storage. Accordingly, core 38 is included in the C-digit storage control circuit 27 to delay the transfer of the information from the shift register to the C-digit register 28 from the B to the following A drive pulse applied by drive pulse generator 23. An output pulse from core 37 will set core 38 to its "1" state and the following drive pulse on lead A from drive pulse generator 23 returns core 38 to its "0" state thereby applying an enabling pulse to lead STC extending to the C-digit register 28.

Similar storage control circuits (not shown in the drawing) are provided in the illustrative embodiment of the present invention for the A- and B-digits of the repetitively received signal code. These storage control circuits respond in a similar manner to the respective digit check circuits (not shown in the drawing) and to the start indication check circuits to control the transfer of the A- and B-digits of the repetitively received signal code from the shift register to the A- and B-digit registers (not shown in the drawing).

In the illustrative embodiment of the present invention three separate digit register circuits are provided for registering the respective plausible digits of the repetitively received signal code. The C-digit register designated 28 in the drawing is shown in detail. The A- and B-digit registers which are identical thereto are not shown. The components and the operation of the C-digit register will be described and will serve to illustrate the operation of the B- and A-digit register which contain identical components. As shown in the drawing, C-digit register 28 comprises a plurality of magnetic cores, 39, 40, 41, 42, 44 and 47. The digit code input to C-digit register 28 is provided by input windings $IN_D$ inductively coupled to each ofthe cores 40, 41, 42, 44 and 47. As shown in Fig. 2, the $IN_D$ input winding on each of these cores is connected through a diode to the output winding OTL on a respective one of cores SR19, SR21, SR23, SR25 and SR27 of the non-reentrant shift register. An enabling input is provided by input winding $IN_E$ inductively coupled to each of the cores 40, 41, 42, 44 and 47. These windings are connected in series to the STC lead from the C-digit storage control circuit 27. Each of cores 39, 40, 41, 42, 44 and 47 of the C-digit register 28 also has inductively coupled thereto a reset winding designated RS, a spill winding designated SPL and a plurality of output windings designated OT. As will be described hereinafter, a reset pulse from utilization circuit 30 will be applied to the reset windings RS on these cores via reset lead RSR to drive these cores to their "1" or set state before registering a digit. As will also be described hereinafter, utilization circuit 30 will apply a pulse via the SP lead to the spill windings SPL on each of these cores to cause the digit registered in the 3-out-of-5 code in the respective cores in the C-digit register 28 to be transferred via leads designated 0 through 9 in cable 31 to utilization circuit 30.

After a digit pattern has been impressed upon the respective checking circuits in the manner described above and while it is being checked, the pattern continues to advance step by step down the respective stages of the non-reentrant shift register of Fig. 2 under control of the alternate drive pulses on leads A and B from drive pulse generator 23. After being advanced three cores the drive pulse on lead A will cause the signal bits comprising the C-digit to be impressed upon the C-digit register 28. At the same time the signal bits comprising the A- and B-digits will in a similar manner be impressed upon the respective A- and B-digit registers. In the manner described hereinbefore, if the C-digit checked and if one of the start indications also checked, an enabling pulse will be applied to the STC lead by the C-digit storage control circuit 27. The enabling pulse on the STC lead applied to input windings $IN_E$ and the pulses obtained from the output windings of the respective cores SR19, SR21, SR23, SR25 and SR27 of the shift register applied to the input windings $IN_D$ on cores 40, 41, 42, 44 and 47 each supply half the current necessary to drive one of the respective cores 40, 41, 42, 44 and 47 in the C-digit register 28 to state "0," these cores having been driven to state "1" previously by the reset pulse applied to the RSR lead from utilization circuit 30. Accordingly, the digit pattern in a 3-out-of-5 code will be registered in the C-digit register. Each drive pulse applied to the A lead from drive pulse generator 23 impresses a signal pattern on C-digit register 28 but registration takes place only if an enabling pulse is applied to the STC lead by C-digit storage control circuit 27. Exact phasing between the enabling pulse on the STC lead and the digit pulses is not required, it being only necessary that the pulses overlap in time long enough to saturate the storage cores.

To transfer of the registered digit in the C-digit register to utilization circuit 30 via the leads in cable 31 is accomplished when utilization circuit 30 applies a signal pulse to the SP lead. As shown in the drawing, this pulse will drive the respective cores 39, 40, 41, 42, 44 and 47 remaining in state "1" to state "0." Assume, for example, that the digit 1 has been stored in C-digit register 28 which as described above will be evidenced by cores 42, 44 and 47 being set in the "0" state while cores 40 and 41 remain in the "1" state. The transfer or spill pulse applied to lead SP will therefore cause cores 39, 40 and 41 to reverse their state to state "0.' The output lead designated 1 in cable 31 will have three equal voltages generated in it, two in the forward direction from cores 40 and 41 and one in the reverse direction from core 39. The net voltage which constitutes the desired signal in utilization circuit 30 will be equal to that produced by one core. The net voltage on the remaining output leads designated 2 through 0 will either be 0 or of reverse polarity in the following order: 0, 0, 0, 0, reversed, 0, 0, reversed, reversed.

Rurther assume, for example, that the digit 9 has been registered in the C-digit register 28. As described above this will be accomplished by pulses applied to the $IN_D$ windings of cores 40, 41 and 44 in coincidence with an enabling pulse applied to the $IN_E$ windings of the same cores from lead STC. The coincidence of these pulses will drive each of the cores 40, 41 and 44 from the "1" state to the "0" state. The enabling pulse on the STC lead is also applied to the $IN_E$ windings of cores 42 and 47 and as indicated above is insufficient to drive cores 42 and 47 to the "0" state, hence these cores remain in their "1" state. When a transfer or spill pulse is applied to the SP lead by utilization circuit 30, cores 39, 42 and 47 will change their state from "1" to "0." The reversal of the state of cores 39, 42 and 47 will cause three equal voltages to be generated in output lead 9 of cable 31, two of these voltages in the forward direction from cores 42 and 47 and one voltage in the reverse direction from core 39. The net forward voltage equal to that produced by one core constitutes the desired signal and is applied to lead 9 in cable 31 extending to utilization circuit 30. The next voltage on the remaining output leads 1 through 8 and 0 will either be 0 or of reverse polarity in the following order: reversed, 0, 0, reversed, reversed, 0, 0, 0, 0.

The repeated reception of the same 3-out-of-5 code for a particular digit on later repetitions of the repetitively received signal code will have no effect on a digit registered in the associated digit register. For example, if the numeral 9 is registered in a 3-out-of-5 code in C-digit register 28 as described above, cores 40, 41 and 44 will be in their "0" state and cores 42 and 47 will be in their "1" state. The repeated reception of a valid digit 9 for the C-digit of the repetitively received signal code will not alter the state of the cores in the C-digit register 28. However, if on subsequent repetitions of the repetitively received signal code a valid digit other than 9 is detected for the C-digit, more than three of the cores 40, 41, 42, 44 and 47 of C-digit register 28 will be driven to the "0" state. For example, if on a subsequent repetition of the received signal code a valid digit 8 for the C-digit is detected, the state of core 42 in C-digit register 28 will also be changed from "1" to "0". Accordingly, the registration of the previous valid digit 9 in C-digit register 28 is effectively destroyed by the attempted registration of the subsequently received valid digit 8. With more than three of the cores 40, 41, 42, 44 and 47 in the "0" state, when the transfer of the digit codes registered in the A-, B- and C-digit registers is made to utilization circuit 30, none of the output leads designated 0 through 9 from C-digit register 28 will have the required forward voltage to indicate a digit value. In this manner the transfer of a value for the C-digit of the three digit codes to utilization circuit 30 is blocked. It is advantageous to block the transfer of the C-digit under these circumstances because there is no way of determining which of the plausible digit codes was the correct one. The later reception of a plausible digit code which differs from a previously received plausible digit code for the same digit of the repetitively received signal code, although unlikely, is possible due to an unrecognized presence of a double error, and thus in accordance with the present invention these heretofore unrecognizable double errors are detected and the utilization circuit 30 is notified of this fact through the lack of transfer of a digit value for the particular digit. Utilization circuit 30 in response to the failure to receive a digit value from any of the digit registers may in a manner well known in the art advantageously reject the entire signal code received from the digit register circuits and await the reception of a new and subsequently received three digit signal code.

The A- and B-digits of the repetitively received signal code are checked for plausibility and registered in their respective digit registers in the same manner as that described above for the C-digit. The codes registered in the respective A- and B-digit registers are subsequently transferred to utilization circuit 30 via leads in cable 31 in response to a spill signal pulse applied to lead SP by utilization circuit 30 in the manner described above for the C-digit register 28.

As indicated hereinbefore, the start indication code and the three digit codes are repetitively transmitted to the receiving station with the number of such repetitive transmissions advantageously predetermined from known factors to assure the desired degree of reliability of reception. After the repetitive transmissions are halted, the three digit codes will be registered in their respective A-, B- and C-digit registers and a signal is given to utilization circuit 30 that the registration has been completed. At the same time the non-reentrant shift register of Fig. 2 is reset to normal in preparation for reception of the signal bits of the next three digit code. The resetting of the non-reentrant shift register and the generation of a registration complete signal is accomplished by reset circuit 29.

In the illustrative embodiment of the present invention as shown in Fig. 2, reset circuit 29 advantageously comprises a monostable or single shot multivibrator of the type known in the art which responds to pulses applied over lead 24 from receiver 21. As indicated hereinbefore, receiver 21 applies synchronizing pulses to lead 24 which correspond in number and phase to the incoming signals received by receiver 21. As long as incoming signals are being received by receiver 21, corresponding synchronizing pulses will be applied to lead 24. The shaded corner shown in the block representing the single shot multivibrator indicates the normally conducting stage of this multivibrator. In response to the first pulse received over lead 24 from receiver 21, the right-hand stage of this multivibrator will become conducting and the multivibrator will remain in this state for a predetermined time whereupon it will switch back to its normal state. By selecting suitable values for the circuit parameters and elements of the monostable multivibrator the switching time may advantageously be determined so that the multivibrator will remain with its right-hand stage conducting as long as synchronizing pulses are applied to lead 24. This interval is such that the normal blank intervals or absence of pulses in the start code and digit signal codes are of insufficient duration to permit the single shot multivibrator to restore to its normal condition. However, when the repetitive reception of the transmitted start and digit codes is halted, the single shot multivibrator which comprises the reset circuit 29 will restore to its normal condition after a predetermined interval and apply a reset pulse through a differentiating circuit comprising capacitor C and resistor R to lead 32.

The reset pulse applied to lead 32 will effect the resetting of all of the magnetic cores of the non-reentrant shift register of Fig. 2. At the same time a pulse from the differentiating circuit is applied over the RC lead to utilization circuit 30 to indicate that registration of the three digits of the repetitively received signal code has been completed. Utilization circuit 30 in response to the pulse over the RC lead will in a manner known in the art apply a spill or transfer signal pulse over the SP lead to the respective A-, B- and C-digit registers. This as described above will effect the transfer of the digits registered in the respective registers over leads in cable 31 to utilization circuit 30. After the respective A-, B- and C-digits are registered in utilization circuit 30, this circuit will in turn apply a signal pulse over the RSR lead to the respective digit register circuits to effect the return of these circuits to their normal condition in preparation for the registration of a subsequently received digit code.

It is to be understood that the above-described arrangements are illustrative of the application of the principles of this invention. Numerous other arrangements may be devised by those skilled in the art without departing from the spirit and scope of the invention.

What is claimed is:

1. A signaling system comprising in combination a signal code generator repetitively generating in succession a plurality of signal codes, a signal code receiver, means for repetitively transmitting the successively generated signal codes to said receiver, checking means for individually checking the plausibility of each of said signal codes received by said receiver on each repetition thereof, and means controlled by said checking means for registering each individual signal code passing a plausibility check during any repetition of the received plurality of signal codes.

2. The combination defined in claim 1 in combination with means for comparing each individual signal code passing a plausibility check with the corresponding plausible signal code received during prior repetitions, and means controlled by said last-named means for blocking the registration of each individual signal code passing a plausibility check and canceling the registration of the corresponding signal code received during prior repetitions when the two signal codes do not match.

3. A signaling system comprising in combination a signal code generator for generating a predetermined number of repetitions of a sequence of signal codes, a signal code receiver, means for repetitively transmitting the sequentially generated signal codes to said receiver, a temporary register for registering each repetition of said signal codes received by said receiver, checking means for individually checking the plausibility of each of said signal codes registered in said temporary register, a plurality of signal code registers for registering respective ones of said signal codes, and means controlled by said checking means and operative after each repetition of said signal codes received by said receiver for transferring the plausible ones of said signal codes from said temporary register to the respective signal code registers associated therewith.

4. The combination defined in claim 3 wherein said signal code generator comprises a reentrant shift register, input means for entering a plurality of information codes in said shift register, means for circulating said codes successively through said shift register a predetermined number of times, and output means responsive to said circulation of said information codes for repetitively producing in succession a plurality of signal codes.

5. The combination defined in claim 4 wherein said reentrant shift register comprises a first and a second plurality of magnetic cores with input, output and advance windings inductively coupled to each of said cores and interconnected to form a two-core per stage reentrant shift register; wherein said input means comprises means for selectively energizing the input windings inductively coupled to particular ones of said first plurality of cores in accordance with said information codes; wherein said means for circulating said information code in said first register comprises a source of drive pulses, means for alternately applying said drive pulses to the advance windings inductively coupled to said first and said second plurality of cores respectively, and means determining the number of said drive pulses alternately applied to said advance windings; and wherein said input means comprises an output winding inductively coupled to a particular one of said cores.

6. The combination defined in claim 3 wherein said temporary register comprises a non-reentrant shift register, means controlled by said receiver for entering the successively received signal codes in said shift register, and means for shifting the signal codes entered in said shift register from stage to stage therein.

7. The combination defined in claim 6 wherein said non-reentrant shift register comprises a first and a second plurality of magnetic cores with input, output and advance windings inductively coupled to each of said cores and interconnected to form a two-core per stage non-reentrant shift register.

8. A signaling system comprising in combination a signal code generator for generating in succession a predetermined number of repetitions of a start signal code and a plurality of digit signal codes, a signal code receiver, means for repetitively transmitting the successively generated start and digit signal codes to said receiver, a shift register, means for registering the start and digit signal codes successively received by said receiver in said shift register, a start signal code checking means connected to said shift register for checking the plausibility of said start signal code registered therein, a plurality of digit signal code checking means connected to said shift register for checking the plausibility of respective ones of said digit signal codes registered therein, a plurality of digit signal code registers for registering respective ones of said digit signal codes, and a plurality of transfer means each associated with a respective one of said digit signal code checking means, each of said transfer means jointly controlled by said start signal code checking means and the digit signal code checking means associated therewith for transferring the respective digit signal code when plausible from said shift register to the one of said digit signal code registers associated therewith.

9. The combination defined in claim 8 wherein each of said digit signal code registers comprises register means for registering the respective one of said digit signal codes, output means, a source of spill signals, means responsive to said spill signals for applying the digit signal code registered in said register means to said output means, comparison means for comparing the digit signal code registered in said register means with the corresponding digit signal code received on a subsequent repetition of said digit signal codes and registered in said shift register, and means controlled by said comparison means for disabling said output means when the digit signal code registered in said register means fails to match the corresponding digit signal code received on a subsequent repetition of said digit signal codes.

10. The combination defined in claim 9 wherein said output means in each of said digit signal code registers also includes means for translating the respective one of said digit signal codes to a different code.

11. A signaling system comprising in combination a signal code generator for generating in succession a predetermined number of repetitions of a start signal code and a plurality of digit signal codes, a signal code receiver, means for repetitively transmitting the successively generated start and digit signal codes to said receiver, a shift register for registering the received digit signal codes and the start signal code both preceding and following the received digit signal codes, means for registering the start and digit signal codes successively received by said receiver in said shift register, a first start signal code checking means connected to said shift register for checking the plausibility of the start signal code registered therein and received prior to each repetition of said digit signal codes, a second start signal code checking means connected to said shift register for checking the plausibility of the start signal code registered therein and received after each repetition of said digit signal codes, a plurality of digit signal code checking means connected to said shift register for checking the plausibility of respective ones of said digit signal codes registered therein, a plurality of digit signal code registers for registering respective ones of said digit signal codes and a plurality of transfer means each associated with a respective one of said digit signal code checking means, each of said transfer means jointly controlled by either one or both of said first and said second start signal code checking means and the digit signal code checking means associated therewith for transferring the respective digit signal code when plausible from said shift register to the one of said digit signal code registers associated therewith.

12. A signaling system comprising in combination a signal code generator for generating a predetermined number of repetitions of a plurality of successive pulse position codes, a code receiver, means for repetitively transmitting the successive code elements of said pulse position codes to said receiver, a shift register, means controlled by said receiver for shifting the successive code elements received thereby through the successive stages of said shift register, checking means responsive to said code elements in said shift register for individually checking the plausibility of each of said pulse position codes registered therein, determining means connected to said shift register for determining when the code elements of all of said pulse position codes have been registered in said shift register, a plurality of code registers for registering respective ones of said pulse position codes, transfer means controlled by said determining means for transferring the pulse position codes registered in said shift register to respective ones of said code registers, and means including said checking means for controlling said transfer means to block the transfer of individual ones of said pulse position codes determined to be implausible.

13. The combination defined in claim 12 wherein one of said pulse position codes comprises a start code generated prior to each repetition of the remaining said pulse position codes and wherein said determining means connected to said shift register comprises means for detecting the presence of the code elements of said start code in said shift register.

14. The combination defined in claim 13 wherein said shift register comprises stages for storing the start code generated prior to each repetition of said remaining pulse position codes, said remaining pulse position codes and the start code generated following each repetition of said remaining pulse position codes, and wherein said means for detecting the presence of the code elements of said start position code in said shift register comprise means for detecting the presence of the code elements of said start code in the said shift register generated both prior to and following each repetition of said remaining pulse position codes.

15. A signaling system comprising in combination a signal code generator for generating a predetermined number of repetitions of a pluarlity of successive pulse position codes, a code receiver, means for repetitively transmitting the successive signal bits of said pulse position codes to said receiver, a shift register having a plurality of groups of stages, each of said groups of stages associated with respective ones of said pulse position codes, means controlled by said receiver for shifting the successive signal bits received thereby through the successive stages of said shift register, a plurality of checking means associated with respective ones of said pulse position codes, each of said checking means connected to the group of stages of said shift register associated with the respective one of said pulse position codes and responsive to the signal bits registered therein to check the plausibility of the pulse position code represented thereby, determining means connected to said shift register to determine when the signal bits comprising the respective pulse position codes have been shifted to the groups of stages of said shift register associated therewith, a plurality of code registers for registering respective ones of said pulse position codes, a plurality of transfer means each connected to a respective one of said code registers and controlled by said determining means for transferring the respective pulse position codes registered in said shift register to the respective one of said registers, and means including said plurality of checking means for disabling the associated ones of said transfer means when the respective ones of said pulse position codes registered in said shift register are implausible.

16. The combination defined in claim 15 wherein each of said transfer means comprises a magnetic core having two magnetic states, means controlled by said determining means for driving said core to one of said two states, means controlled by the checking means associated therewith for holding said core to the other of said two states, and means operable when said core is in said one state to apply an enabling pulse to the one of said code registers associated therewith.

17. The combination defined in claim 16 wherein each of said code registers comprises a plurality of magnetic cores each having two magnetic states and means responsive to the enabling pulse from the respective one of said transfer means and to the signal bits in said shift register comprising the respective one of said pulse position codes for setting said cores to their first and second states in acordance with said pulse position code.

18. The combination defined in claim 17 wherein each of said code registers also comprises a plurality of output conductors inductively coupled to said magnetic cores therein and means for applying a signal to the one of said output conductors corresponding to the pulse position code set in said magnetic cores.

19. The combination defined in claim 15 wherein one of said pulse position codes comprises a start code having signal bits in $w$-out-of-$z$ positions, said start code being generated prior to each repetition of the remainder of said pulse position codes, and wherein said determining means connected to said shift register comprises means connected to the group of stages of said shift register associated with said start code and operative in response to signal bits in $w$-out-of-$z$ stages thereof.

20. The combination defined in claim 15 wherein one of said pulse position codes comprises a start code having signal bits in $w$-out-of-$z$ positions, said start code being generated prior to each repetition of the remainder of said pulse position codes; wherein said shift register includes a first group of stages associated with the start code generated prior to each repetition of said remainder of said pulse position codes and a second group of stages associated with the start code generated prior to the succeeding repetition of said remainder of said pulse position codes; and wherein said determining means connected to said shift register comprises first means connected to said first group of stages operative in response to signal bits in $w$-out-of-$z$ stages thereof and second means connected to said second group of stages operative in response to signal bits in $w$-out-of-$z$ stages thereof.

21. The combination defined in claim 20 wherein said first means and said second means each comprise $z$ magnetic cores each having two magnetic states and means responsive to the signal bits in the respective group of stages of said shift register for setting $w$-out-of-$z$ of said cores to one state and $z$ minus $w$ of said cores to the other state.

22. The combination defined in claim 19 wherein each of said remainder of said pulse position codes comprises signal bits in $x$-out-of-$y$ positions and wherein each of said checking means connected to a respective group of stages of said shift register comprises first means responsive to signal bits in more than $x$-out-of-$y$ stages of said group of stages for disabling the associated one of said transfer means and second means responsive to signal bits in less than $x$-out-of-$y$ stages of said group of stages for disabling the associated ones of said transfer means.

23. The combination defined in claim 22 wherein said first means comprises a magnetic core having two magnetic states, means responsive to signal bits in more than $x$-out-of-$y$ stages in said group of stages to drive said core to a first of said two states and means operable when said core is in said first of said two states for disabling said transfer means associated therewith and wherein said second means comprises a magnetic core having two magnetic states, means responsive to signal bits in less than $x$-out-of-$y$ stages of said group of stages to drive said core to a second of said two states, and means operable when said core is set in said second of said two states for disabling said transfer means associated therewith.

References Cited in the file of this patent

UNITED STATES PATENTS

| | | |
|---|---|---|
| 2,691,153 | Rajchman | Oct. 5, 1954 |
| 2,694,801 | Bachelet | Nov. 16, 1954 |
| 2,696,599 | Holbrook | Dec. 7, 1954 |